United States Patent
Ding et al.

(10) Patent No.: US 11,512,818 B2
(45) Date of Patent: Nov. 29, 2022

(54) MULTI-MODE PORTABLE LIGHTING DEVICE WITH NOVEL BATTERY CHARGING UNIT

(71) Applicants: Junming Ding, Shanghai (CN); Rayford Higginbotham, Huntington Beach, CA (US); Chengping Chen, Irvine, CA (US)

(72) Inventors: Junming Ding, Shanghai (CN); Rayford Higginbotham, Huntington Beach, CA (US); Chengping Chen, Irvine, CA (US)

(*) Notice: Subject to any disclaimer, the term of this patent is extended or adjusted under 35 U.S.C. 154(b) by 133 days.

(21) Appl. No.: 16/926,610

(22) Filed: Jul. 10, 2020

(65) Prior Publication Data

US 2022/0010936 A1  Jan. 13, 2022

(51) Int. Cl.
| | |
|---|---|
| *F21L 4/08* | (2006.01) |
| *H02J 7/00* | (2006.01) |
| *H01M 10/42* | (2006.01) |
| *G01S 19/05* | (2010.01) |

(52) U.S. Cl.
CPC .............. *F21L 4/085* (2013.01); *G01S 19/05* (2013.01); *H01M 10/425* (2013.01); *H02J 7/007* (2013.01); *H02J 7/00032* (2020.01); *H02J 2207/30* (2020.01)

(58) Field of Classification Search
CPC ....... F21L 4/085; H02J 7/00032; H02J 7/007; H02J 2207/30; G01S 19/05; H01M 10/425; H01M 10/4271; H01M 2220/30
See application file for complete search history.

(56) References Cited

U.S. PATENT DOCUMENTS

| | | |
|---|---|---|
| 4,933,178 A | 6/1990 | Capelli |
| 5,066,328 A | 11/1991 | Zlotnik |
| 5,236,773 A | 8/1993 | Sorathia et al. |
| 5,238,749 A | 8/1993 | Cueman et al. |
| 5,244,667 A | 9/1993 | Hagiwara et al. |
| 5,322,555 A | 6/1994 | Leung et al. |
| D367,721 S | 3/1996 | Maglica |

(Continued)

FOREIGN PATENT DOCUMENTS

WO  01/89721 A1  11/2001

*Primary Examiner* — Bao Q Truong
(74) *Attorney, Agent, or Firm* — Hackler Daghighian Martino & Novak

(57) ABSTRACT

Portable lighting devices, systems and methods are provided. The portable lighting devices may include a light source, a rechargeable battery, a battery charging and control circuitry, a power connector port and a wireless communication circuitry. The battery charging and control circuitry may be configured to control transmission of current from the rechargeable battery to the light source, and transmission of current from the rechargeable battery through the power connector port and onto an external device. The transmission of current to the external device may occur when the rechargeable battery has a charge capacity above a predetermined threshold level and terminates when the charge capacity of the rechargeable battery is at or below the predetermined threshold level. The wireless communication circuitry may be configured to transmit a battery condition information of the rechargeable battery to an external communication device through a wireless link.

17 Claims, 12 Drawing Sheets

(56) References Cited

U.S. PATENT DOCUMENTS

| | | | |
|---|---|---|---|
| 5,681,575 A | 10/1997 | Burrell et al. | |
| 5,752,761 A * | 5/1998 | Pietruczynik | F21V 9/38 |
| | | | 250/462.1 |
| 5,753,251 A | 5/1998 | Burrell et al. | |
| 5,756,145 A | 5/1998 | Darouiche | |
| 5,770,255 A | 6/1998 | Burrell et al. | |
| 5,837,362 A | 11/1998 | O'Connell et al. | |
| 5,853,745 A | 12/1998 | Darouiche | |
| 5,997,815 A | 12/1999 | Anders et al. | |
| 6,020,419 A | 2/2000 | Bock et al. | |
| 6,025,059 A | 2/2000 | McGee | |
| 6,238,686 B1 | 5/2001 | Burrell et al. | |
| 6,361,567 B1 | 3/2002 | Dearnaley | |
| 6,387,519 B1 | 5/2002 | Anderson et al. | |
| 6,514,517 B2 | 2/2003 | Jamiolkowski et al. | |
| 6,565,913 B2 | 5/2003 | Arps et al. | |
| 6,592,814 B2 | 7/2003 | Wilcox et al. | |
| 6,759,478 B2 | 7/2004 | Anderson et al. | |
| 6,803,408 B2 | 10/2004 | Anderson et al. | |
| 6,835,420 B1 | 12/2004 | Roeckrath et al. | |
| 6,900,265 B2 | 5/2005 | Schultz et al. | |
| 6,916,368 B2 | 7/2005 | Vanier et al. | |
| 6,929,705 B2 | 8/2005 | Myers et al. | |
| 7,053,149 B2 | 5/2006 | Anderson et al. | |
| 7,115,050 B2 | 10/2006 | Andre et al. | |
| 7,264,669 B1 | 9/2007 | Tomasino et al. | |
| 7,282,214 B2 | 10/2007 | Willcox et al. | |
| 7,402,318 B2 | 7/2008 | Morris et al. | |
| 7,625,579 B2 | 12/2009 | Read et al. | |
| 7,641,912 B1 | 1/2010 | Redler | |
| 7,646,973 B2 | 1/2010 | Howard et al. | |
| 7,662,433 B2 | 2/2010 | Ford et al. | |
| 7,867,602 B2 | 1/2011 | Hsu | |
| 7,871,690 B2 | 1/2011 | Ashikaga | |
| 7,884,089 B2 | 2/2011 | Gimvang | |
| 7,955,636 B2 | 6/2011 | Terry | |
| 7,976,863 B2 | 7/2011 | Wilcox et al. | |
| 8,066,854 B2 | 11/2011 | Storey et al. | |
| 8,080,028 B2 | 12/2011 | Cagle | |
| 8,084,132 B1 | 12/2011 | Lezdey | |
| 8,124,169 B2 | 2/2012 | Ylitalo et al. | |
| 8,133,423 B2 | 3/2012 | Tang et al. | |
| 8,137,735 B2 | 3/2012 | Wang et al. | |
| 8,163,357 B2 | 4/2012 | Engardio et al. | |
| 8,169,165 B2 | 5/2012 | West | |
| 8,172,395 B2 | 5/2012 | Carney et al. | |
| 8,178,120 B2 | 5/2012 | Vandesteeg et al. | |
| 8,366,290 B2 | 2/2013 | Maglica | |
| 8,494,374 B2 | 7/2013 | Snyder | |
| 8,783,908 B2 | 7/2014 | Gross et al. | |
| 8,852,693 B2 | 10/2014 | Legein et al. | |
| 9,065,282 B2 * | 6/2015 | Liu | H01M 50/213 |
| 9,363,860 B1 | 6/2016 | Lowchareonkul | |
| 9,671,102 B2 | 6/2017 | Maglica | |
| 9,683,729 B2 | 6/2017 | Rothschild | |
| 10,670,253 B1 * | 6/2020 | Lemon | F21V 23/0421 |
| 2003/0057889 A1 | 3/2003 | Avis | |
| 2006/0083878 A1 | 4/2006 | Bauman | |
| 2006/0171700 A1 | 8/2006 | Yang et al. | |
| 2006/0222845 A1 | 10/2006 | Deng et al. | |
| 2007/0259307 A1 | 11/2007 | Quan | |
| 2008/0272928 A1 | 11/2008 | Shuster | |
| 2009/0097235 A1 | 4/2009 | Chambers | |
| 2009/0182337 A1 | 7/2009 | Stopek | |
| 2009/0185368 A1 | 7/2009 | Holmes et al. | |
| 2009/0202656 A1 | 8/2009 | Gimvang | |
| 2009/0310342 A1 | 12/2009 | Chang | |
| 2010/0119802 A1 | 5/2010 | Ford | |
| 2011/0058142 A1 | 3/2011 | Berit-Debat et al. | |
| 2011/0068741 A1 * | 3/2011 | Liu | F21V 33/00 |
| | | | 362/183 |
| 2011/0097574 A1 | 4/2011 | Faldysta et al. | |
| 2011/0151218 A1 | 6/2011 | Berstenhorst et al. | |
| 2011/0206817 A1 | 8/2011 | Arnold et al. | |
| 2011/0311591 A1 | 12/2011 | Wang et al. | |
| 2012/0003483 A1 | 1/2012 | Saiz et al. | |
| 2012/0069165 A1 | 3/2012 | Choi et al. | |
| 2012/0100380 A1 | 4/2012 | Groenewolt | |
| 2012/0121845 A1 | 5/2012 | Groenewolt et al. | |
| 2019/0011089 A1 * | 1/2019 | Whiting | F21V 15/012 |
| 2019/0072835 A1 * | 3/2019 | Lee | G03B 15/03 |
| 2019/0150249 A1 | 5/2019 | Bertken et al. | |
| 2019/0253670 A1 | 8/2019 | Chien | |

\* cited by examiner

MULTI-MODE PORTABLE LIGHTING DEVICE WITH NOVEL BATTERY CHARGING UNIT

RELATED APPLICATIONS

This application is related to concurrently filed, co-pending, and commonly assigned U.S. application Ser. No. 16/926,601, entitled "Portable Devices, Systems and Methods for Alert Notification," the disclosure of which is incorporated herein by reference in its entirety.

FIELD OF THE INVENTION

This patent document relates to portable lighting devices, including, for example, flashlights, headlamps and their circuitry. More particularly the subject matter of this patent document relates to multi-mode portable lighting devices that include monitoring sensors and auxiliary battery capacity.

DESCRIPTION OF THE RELATED ART

Light sources, such as flashlights or headlamps, are widely used in households. They are also used by various professions, such as police, firemen, military and security personnel, as well as used for various activities, such as extreme sports, camping, walking, jogging or other activities in low-lit areas. Moreover, lights sources are commonly used in emergency situations that may be unsafe, due to a power failure or in a remote area with risk to safety.

Despite the use of light sources for a long time, improvements made to these devices as compared to other consumer electronics have been minimal. Prior art light sources generally don't give the user valuable information relating to the light source or its location, such as GPS location, temperature or accelerometer data, nor do known light sources provide a capability to supply power to auxiliary devices. Indeed, in remote areas where there is no power source or in areas where there is a power failure, the ability to continue using personal electronic devices without an auxiliary power source is limited. Thus, the need for improvements to portable lighting devices still remains.

The present disclosure provides an improved portable light source, such as a flashlight or a headlamp, with a battery bank and one or more sensors, integrated in a unique and inventive solution that may optionally be associated with a software App running on a smart device, such as a cell-phone or tablet.

SUMMARY

Portable lighting devices, systems and methods are provided. In one embodiment, the portable lighting devices may include a housing, a light source, a rechargeable battery, a battery charging and control circuitry, a power connector port and a wireless communication circuitry. The housing may have a proximal end and a distal end and defining a hollow cavity. The light source may be disposed at the proximal end of the housing, and electrically coupled to the rechargeable battery. The battery charging and control circuitry may be disposed in the cavity of the housing and operatively coupled to the rechargeable battery.

In one embodiment, the battery charging and control circuitry may be configured to control transmission of current from the rechargeable battery to the light source, and transmission of current from the rechargeable battery through the power connector port and onto an external device. The transmission of current to the external device may occur when the rechargeable battery has a charge capacity above a predetermined threshold level and terminates (or does not initiate) when the charge capacity of the rechargeable battery is at or below the predetermined threshold level. The predetermined threshold level may be set at a value within a range between 5% charge capacity and 30% charge capacity.

In one embodiment, the wireless communication circuitry of the portable lighting device may be configured to transmit a battery condition information of the rechargeable battery to an external communication device through a wireless link. The wireless link may be formed between the wireless communication circuitry and circuitry of the external communication device, the circuitry selected from a group consisting of Bluetooth circuitry, Wi-Fi circuitry and wireless mobile communication circuitry.

As can be appreciated, the portable lighting devices may include at least one sensor electrically coupled to the rechargeable battery and disposed in the cavity of the housing. The at least one sensor may be configured to detect a condition in which the portable lighting device is exposed and to output an associated sensor data. The at least one sensor may include a Global Positioning Satellite (GPS) locator, a temperature sensor, an accelerometer, a pedometer, or any combination of any of the foregoing. The wireless communication circuitry may be operatively coupled with the at least one sensor, and configured to transmit the sensor data to the external communication device.

In yet another embodiment, the portable lighting devices may include a memory electrically coupled to a processor and the at least one sensor. The memory may be used to store data such as sensor data, model number data, part number data, serial number data, manufacturing data, electrical power source data, battery data, electrical power source charging data, battery charging data, operating time data, operating mode data, user operating mode settings, voltage data, current data, processor data, firmware data, failure data, diagnostic data, or any combination of any of the foregoing.

As can be appreciated, the power connector port may be a USB-C connector port, a micro-USB connector port, a USB connector port or a Lighting® connector port. In one embodiment, the portable lighting devices may include a protective coating disposed on an exterior surface of the housing, the protective coating has an oleophobicity level of at least 5 and a thickness between about 250 nm and about 500 nm.

In yet another embodiment, portable lighting systems are provided. The portable lighting systems include the portable lighting device and an external communication device. The external communication device may be wirelessly coupled to the portable lighting device, and configured (for example, using a software application) to provide a battery condition information of the rechargeable battery in the portable lighting device. In another embodiment, the external communication device may be configured to provide a condition in which the portable lighting device is exposed based on the sensor data received from the portable lighting device.

Each of the foregoing various aspects, together with those set forth in the claims and described in connection with the embodiments summarized above and disclosed herein may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Figure 1:
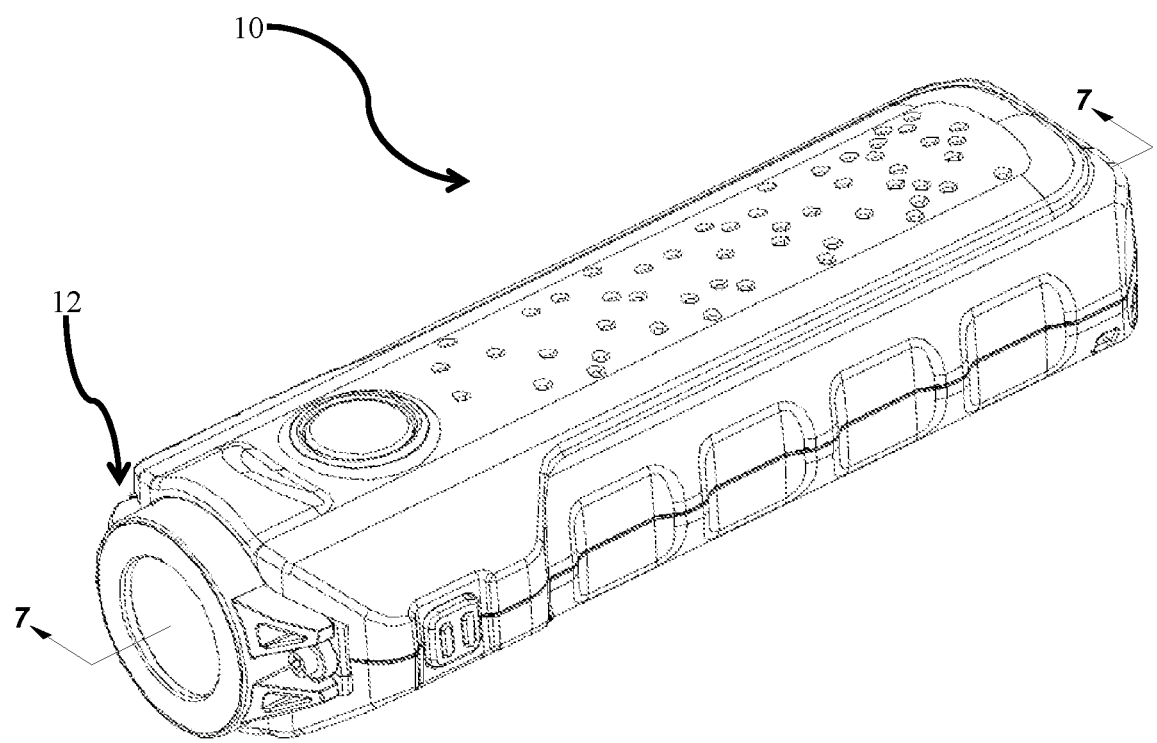
FIG. 1 is a front side perspective view of a multi-mode portable flashlight, according to an embodiment.
Figure 2:
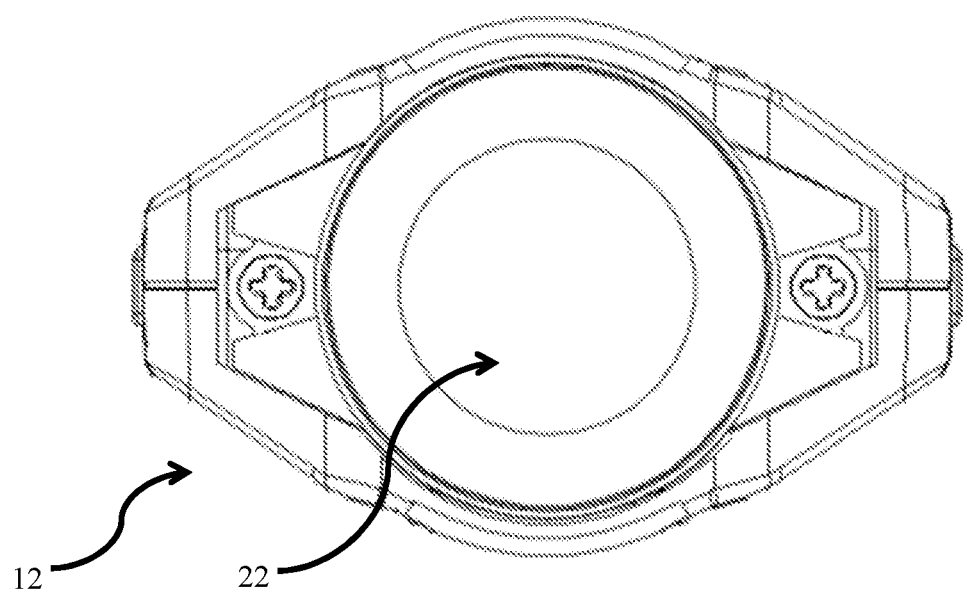
FIG. 2 is a front plan view of the multi-mode portable flashlight of FIG. 1, according to an embodiment.
Figure 3A:
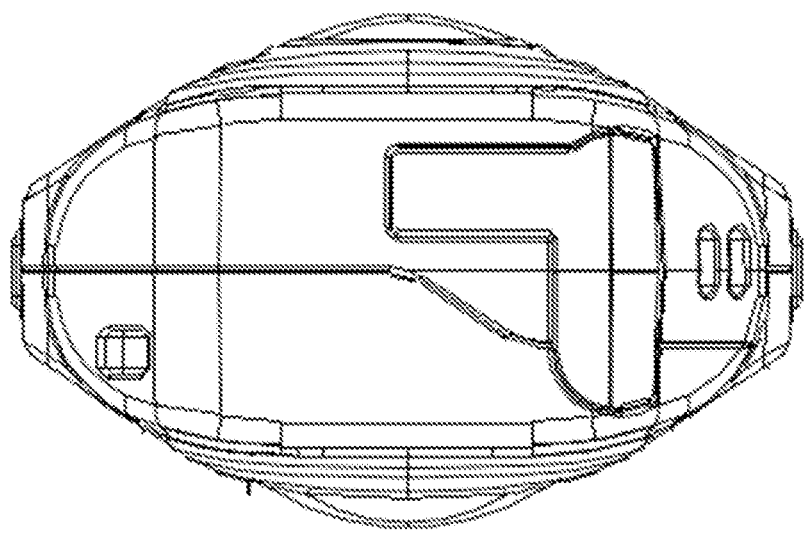
FIG. 3A is a rear plan view of the multi-mode portable flashlight of FIG. 1 with a cover for the power connector port, according to an embodiment.
Figure 3B:
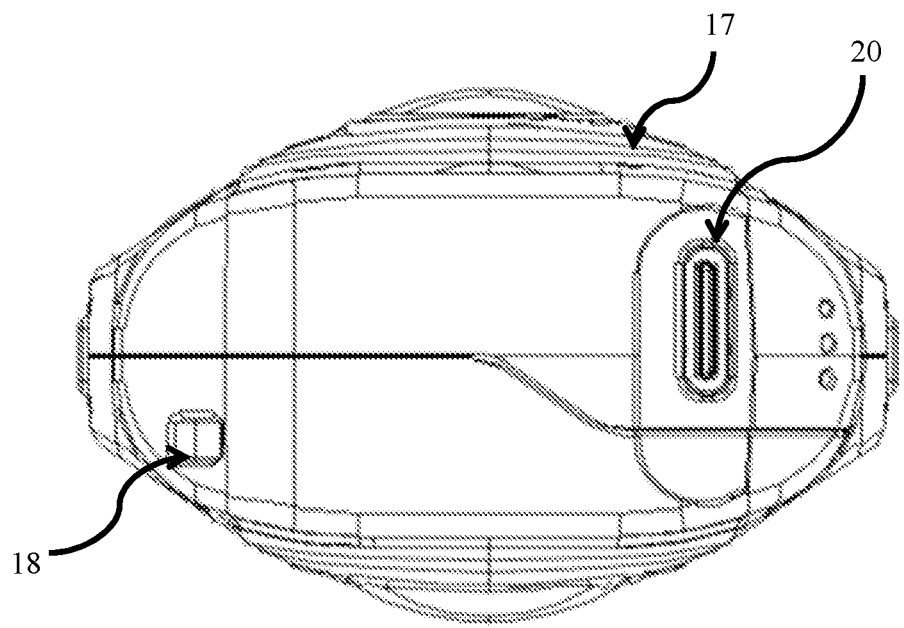
FIG. 3B is a rear plan view of the multi-mode portable flashlight of FIG. 1 without a cover for the power connector port, according to another embodiment.
Figure 4:
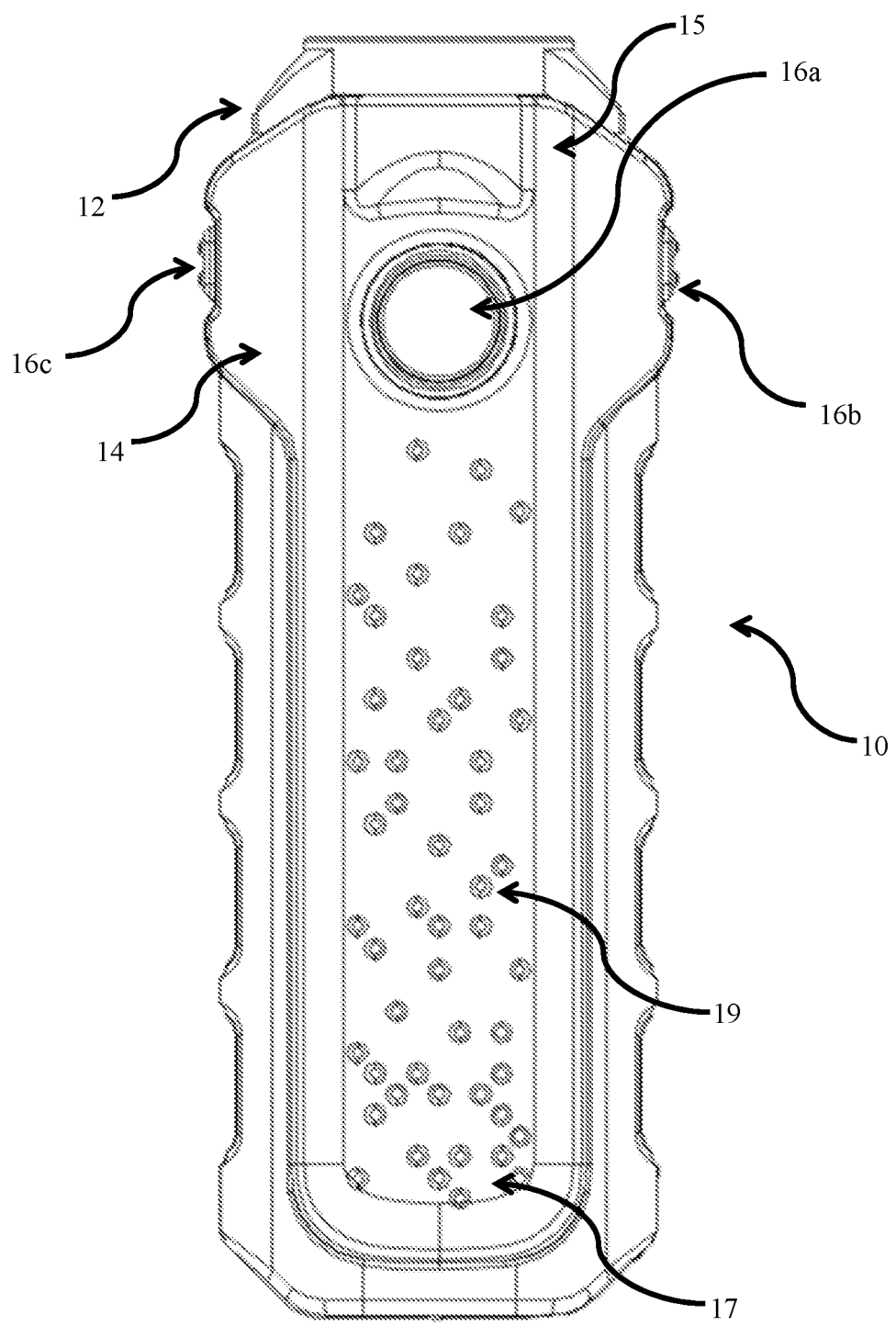
FIG. 4 is a top view of the multi-mode portable flashlight of FIG. 1, according to an embodiment.
Figure 5:
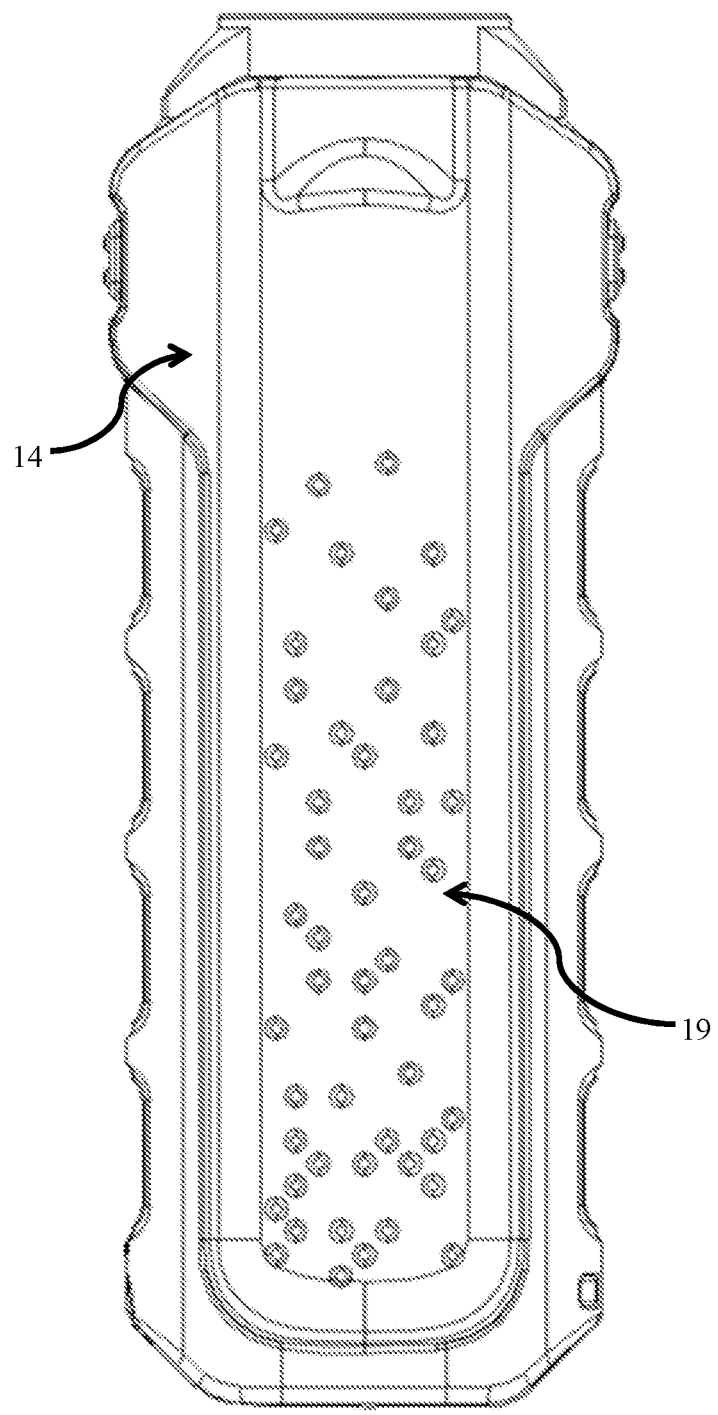
FIG. 5 is a bottom of the multi-mode portable flashlight of FIG. 1, according to an embodiment.
Figure 6A:
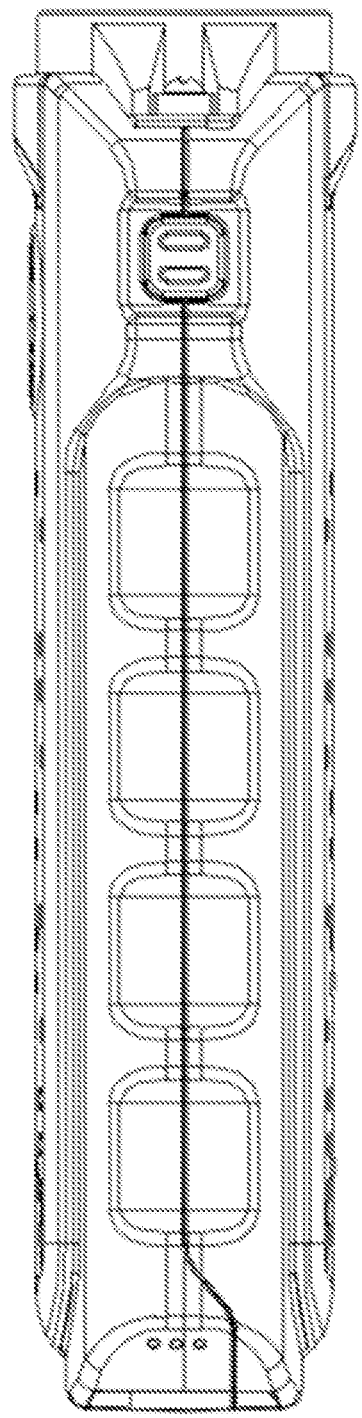
FIG. 6A is a right-side view of the multi-mode portable flashlight of FIG. 1, according to an embodiment.
Figure 6B:
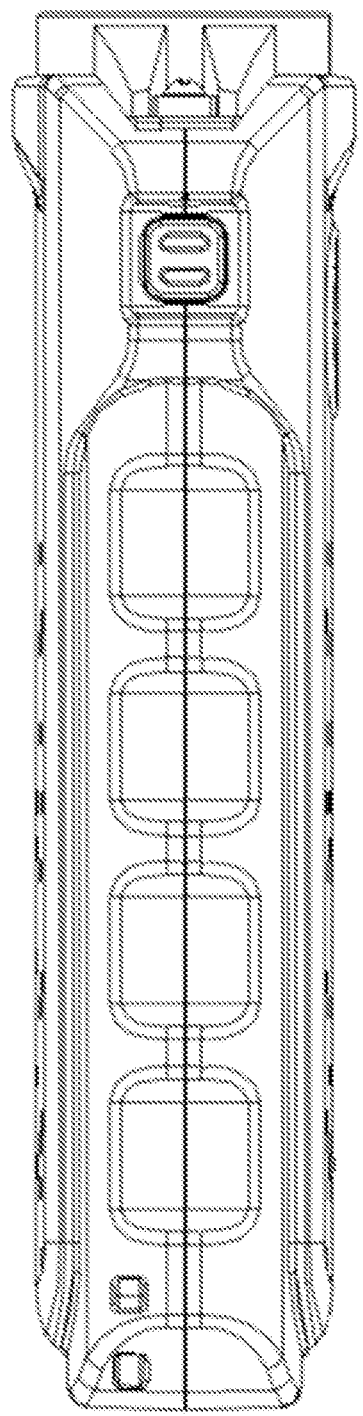
FIG. 6B is a left side view of the multi-mode portable flashlight of FIG. 1, according to an embodiment.

Unique and inventive multi-mode portable lighting devices, systems and methods of operation are disclosed herein. In one embodiment, the portable lighting device may be a flashlight or a headlamp. Examples of flashlights are described in U.S. Pat. Nos. 8,366,290, 8,169,165 and 9,671,102, the disclosures of which are specifically incorporated by reference in their entirety. Although flashlight embodiments are disclosed herein, it is to be expressly understood that the present invention is not restricted solely to such embodiments. Rather, the present disclosure is directed to each of the inventive features described below, both individually as well as collectively, in various embodiments. Further, as will become apparent to those skilled in the art, one or more aspects of the present disclosure may be incorporated in other portable lighting devices, for example, headlamps.

FIGS. 1-6 disclose a multi-mode portable lighting device in the form of a flashlight 10, according to an embodiment. Flashlight 10 may include a head assembly 12, a housing 14, one or more control switches 16 (e.g., 16a, 16b, 16c), a speaker 18, and power connector port 20. The head assembly 12 is disposed about the forward end of the housing 14. The housing 14 has a proximal end 15 and a distal end 17. The housing 14 may define a hollow cavity for receiving flashlight internal components. Housing 14 may also include one or more apertures and mounting features for mounting exterior components of the flashlight 10, such as the head assembly 12, switches 16, and connector port 20 and for permitting such components to be operatively connected to the internal components and circuitry of the flashlight 10. Housing 14 may also include an exterior surface with elongated gripping portion 19. In one embodiment, the power connector port 20 may be disposed about the distal end 17 of the housing 14, and the control switches 16 may be disposed on the top and/or a side of the housing 14. In other embodiments, the power connector port 20 and the control switch 16 may be advantageously positioned elsewhere on or about the housing 14.

As can be appreciated, the one or more control switches 16 may be used to control an actuation of the flashlight 10, a selection of ON/OFF power, a selection of Mode change, a status check on the flashlight 10, and/or an actuation of an alert SOS feature, among others. These features may be controlled through several control switches 16 on the flashlight 10. Alternatively, the features may be controlled though an integrated control switch 16. As shown in the exemplary embodiment on FIGS. 1-2, the flashlight 10 includes a top control switch 16a that may be used to control the actuation of a light source 22 (i.e. LED), a first side control switch 16b that may be used to control actuation and/or selection of LED lighting mode and power ON/OFF, and a second side control switch 16c that may be used to control actuation of device status check for wireless signal and/or battery capacity, among others. In another embodiment, the first side control switch 16b may be used for auxiliary features, such as a momentary flash feature, which momentarily flashes the light, or turn on warning LEDs or audio feature, and the second side control switch 16c may be used as a power ON/OFF of the device with a long press (i.e. 5 second press) and/or used as a "check" button to check device status, such as network connectivity, GPS lock and battery level.

As can be appreciated, the battery status check may be triggered with a single actuation of the second side control switch 16c, and may be configured to provide a warning LED or preset audio alert from speaker 18. For example, for an audio alert, the message may be full, above 80%, above 60%, above 40% and/or low. As another example, for warning LEDs, a blue light for a certain time period, i.e., 3 seconds, may represent battery above 80%, a yellow light may represent battery at or about 40%, and a red light may represent that the battery is low. Moreover, the network connectivity status check may, for example, be triggered with a double actuation of the second side control switch 16c, and may also be configured to provide a warning LED or preset audio alert from speaker 18. For example, for an audio alert, the message may "Good Network and GPS Signal," "GPS Signal Lost," and/or "All Signal Lost." As another example, for warning LEDs, a blue light for a certain time period, i.e., 3 seconds, may represent good signal, a yellow light may represent no GPS, and a red light may represent all signal lost.

In one embodiment, the light source 22 may be triggered to turn on momentarily with the actuation of the first side control switch 16b, and turns off when the first side control switch 16b is released. In another embodiment, the audio alert for battery status may be turned on/off with the actuation of the first side control switch 16b. For example, when actuating the first side control switch 16b for a certain period, i.e. 2 seconds, then the audio speaker 18 is turned ON/OFF for replay of preset audio alert.

In yet another embodiment, the top control switch 16a may be used to actuate the LED light source 22, and may be programmed with different LED light modes that change depending on the number of times the top control switch 16a is actuated and the sequence, for example, every actuation of the top control switch 16a may toggle through the actuation of one or more of the following exemplary operating modes of the light source: high, mid, low, fast-flashing, slow-flashing, etc.

In an alternative embodiment, the one or more control switches 16 may be depressed together to actuate other operations. For example, the first side control switch 16b and the second side control switch 16c may be depressed simultaneously to actuate an alert SOS/Panic/Emergency mode. In response to the actuation of the control switch 16, the speaker 18 may play preset audio to the user.

Figure 7:
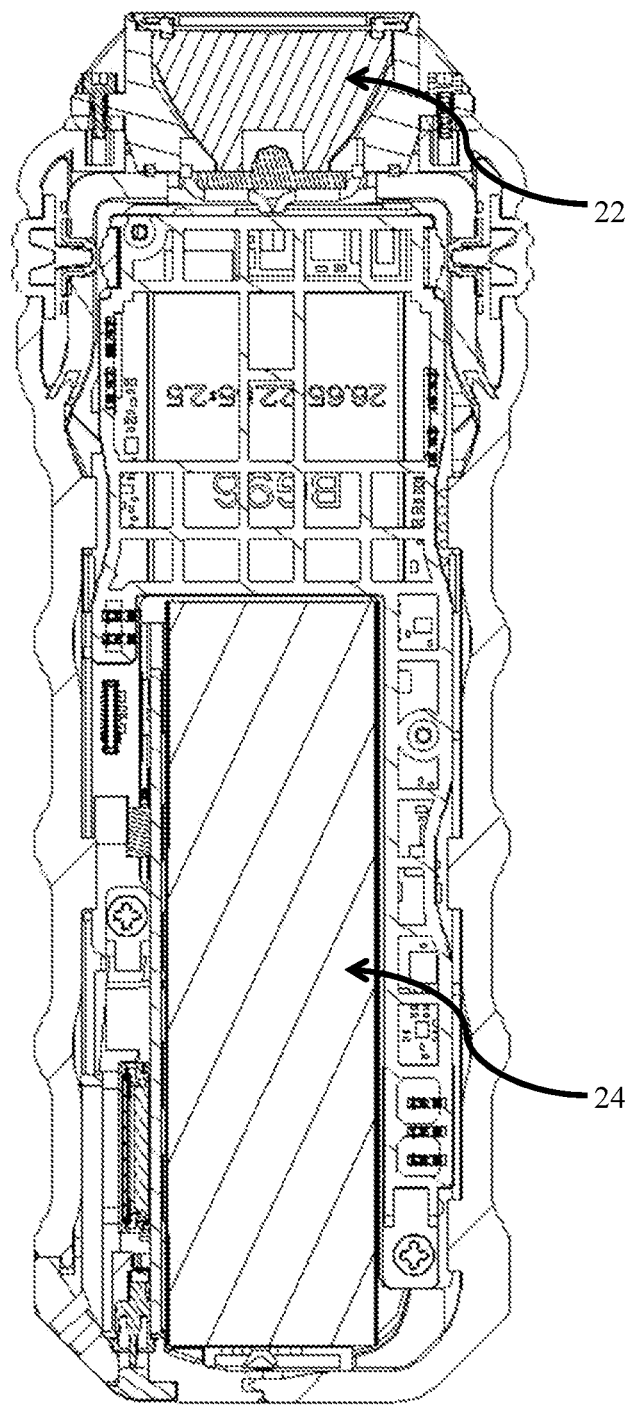
FIG. 7 is a cross-sectional view of the multi-mode portable flashlight of FIG. 1 taken along cut line 7-7 in FIG. 1, according to an embodiment.

FIG. 7 is a cross-sectional view of the multi-mode portable flashlight of FIG. 1 taken through the plane indicated by 7-7 in FIG. 1. A light source 22 is disposed at the proximal end 15 of the housing 14, preferably at a distal end of head assembly 12. In one embodiment, the light source 22 may be a Light Emitting Diode (LED), but may also include an incandescent light source, such as halogen light source, xenon light source, krypton light source or tungsten-filament light source. In one embodiment, the light intensity output of the light source 22 may range from about 100 Lumens to about 10000 Lumens depending on the flashlight model. Desirably, the light intensity output of the light source 22 may range from about 100 Lumens to about 4000 Lumens.

Figure 8:
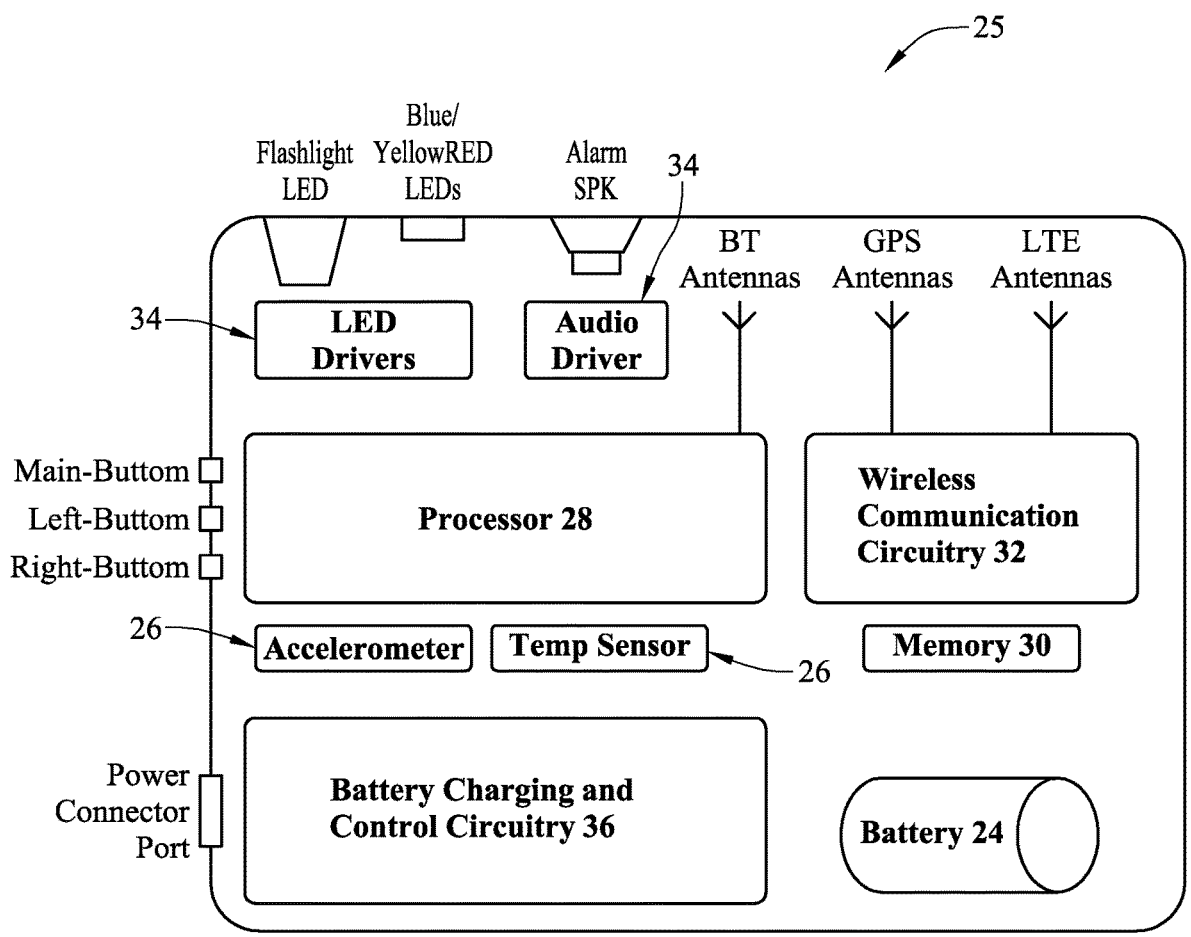
FIG. 8 is an exemplary block diagram illustrating circuitry of the multi-mode portable flashlight of FIG. 1, according to an embodiment.
Figure 11:
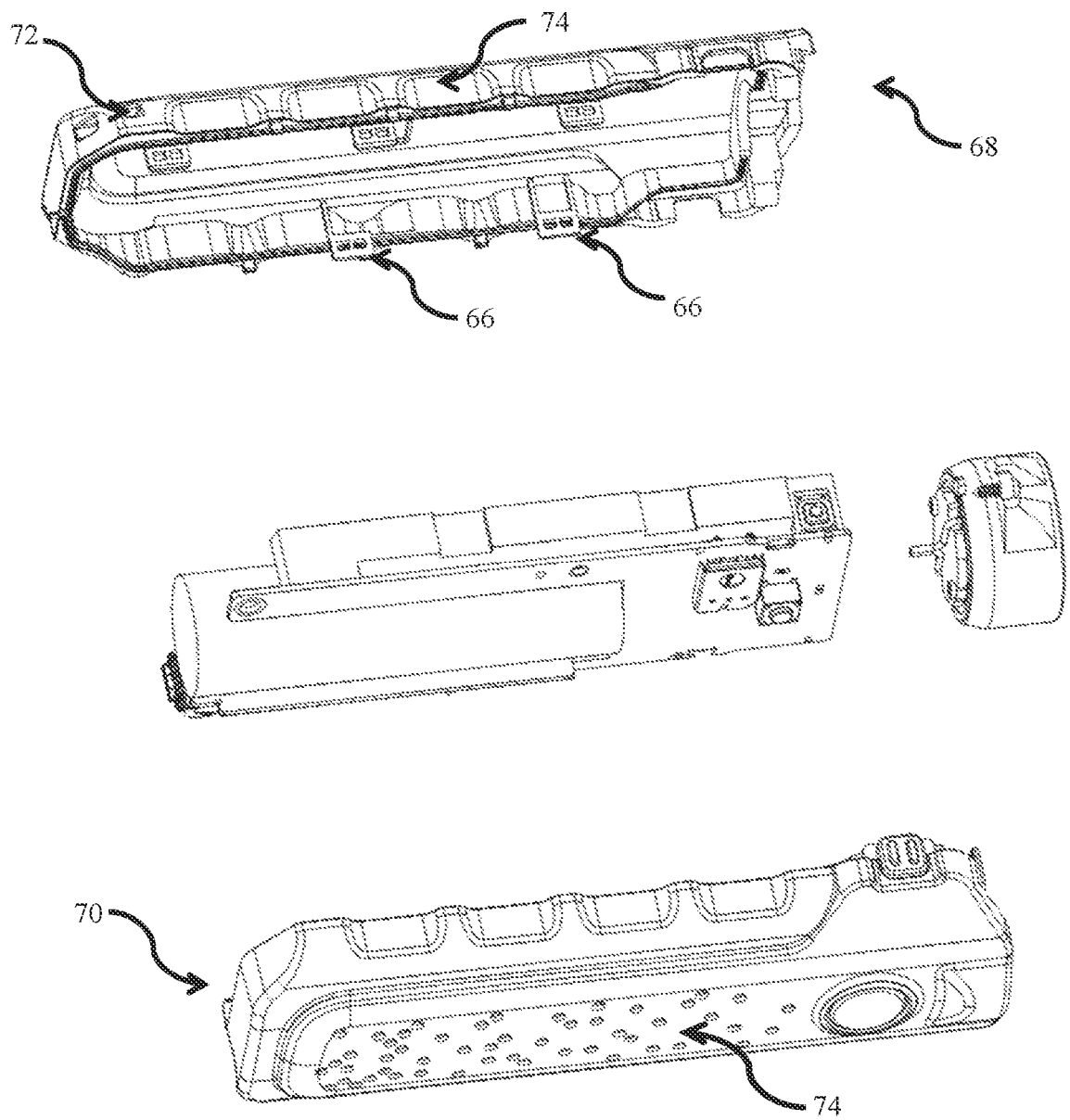
FIG. 11 is an exploded view of the multi-mode portable flashlight of FIG. 1, according to an embodiment.

FIG. 8 is an exemplary block diagram 25 illustrating circuitry of the flashlight of FIG. 1, according to an embodiment. The flashlight may include, for example, a battery bank 24, one or more sensors 26, a processor 28, a memory 30, a wireless communication circuitry 32, a DC-DC switch (not shown), one or more drivers 34, and a battery charging and control circuitry 36. In one embodiment, the battery bank 24 comprises on or more lithium-ion (preferably rechargeable) batteries. The battery bank 24 may be shaped generally cylindrical, as shown in FIG. 11, to fit within the housing 14, but may have other shapes as well. Desirably, the thickness t of the battery bank 24 may be in the range of between about 18-19 mm thick. The battery bank 24 may, for example, be able to hold 3.7 V or 3350 mAh of charge with a pulse current of 12 A.

In one embodiment, the battery bank 24 may be used to supply power to the flashlight 10. In another embodiment, the battery bank 24 may also be used as a power bank to supply power to external electric devices via a charge cable electrically coupled to the power connector port 20. As can be appreciated, the power connector port 20 may be configured to receive a USB-C (USB Type-C) connector used in many electronic devices. Other types of connectors are also contemplated, including micro-USB and USB connectors used with other electronic devices. Alternatively, the power connector port 20 may be configured to receive a Lightning® connector used in Apple® iPhone® mobile devices. As can be appreciated, the power connector port 20 may also be used to couple the battery bank 24 to a power supply to recharge the batteries.

The one or more sensors 26 may be used to detect physical conditions, e.g., environment, in which the flashlight 10 is operated or exposed. For example, the one or more sensors 26 may include a heat sensor, a motion sensor, a temperature sensor, a GPS locator, and a pedometer. Other types of sensors may also be suitable. As can be appreciated, the motion sensor may be configured, for example, as a 3-axis accelerometer to optionally measure static acceleration (such as gravity), tilt of an object, dynamic acceleration, velocity, orientation and vibration of the object. Other known or developed sensors may also be employed to provide desired functionality to flashlight 10, such as temperature sensors, light sensors, magneto sensors, gyrometers, $CO_2$ sensors, etc. In one embodiment, the control switch 16c may be used to select a mode that actuates the operation of the one or more sensors 26. Other control switches may be employed to control the selection and actuation of the one or more sensors 26.

The data produced from the one or more sensors 26 may include, for example, temperature data, acceleration data, location and/or Global Positioning Satellite (GPS) coordinate data, pedometer data, or any combination of any of the foregoing. The data may be processed by the processor 28 and stored in memory 30. Other data relating to the flashlight 10 may also be stored in memory 30 and may be utilized by the processor 28 including, for example, model number data, part number data, serial number data, manufacturing data, electrical power source data, battery data, electrical power source charging data, battery charging data, operating time data, operating mode data, user operating mode settings, control switch 16 actuation data, voltage data, current data, processor data, firmware data, failure data, diagnostic data, among others, or any combination of any of the foregoing.

Memory 30 may include non-volatile read-only memory and/or non-volatile read/write memory as may be desired. For example, data stored by the manufacturer, e.g., model and part number, serial number and date of manufacture may be stored in a read-only memory such as an EPROM as might operating firmware, whereas other data, e.g., operating data, GPS coordinate data, temperature data and settings, may be stored in non-volatile memory such as RAM. All data could be stored in a memory that may be a part of processor 28 or may be wholly or partly separate therefrom.

The processor 28 may be utilized to process data from the one or more sensors 26 and/or the memory 30. As can be appreciated, the processor 28 may be a micro-controller, a microprocessor, a CPU, a processing device on a chip, or equivalent, which may be operatively coupled, for example, to the battery bank 24, the one or more sensors 26, the memory 30, the wireless communication circuitry 32, a DC-DC switch (not shown), the battery charging and control circuitry 36, the light source 22, the control switches 16 and the speaker 18. In one embodiment, the processor 28 may be a system-on-chip, such as Nordic Semiconductor's nRF52840 SoC with integrated Bluetooth 5 capability (including long range and high throughput modes), advanced IoT security, and a Cortex-M Series processor.

In one embodiment, the wireless communication circuitry 32 may be configured for transmission of radio frequency signals conforming to the Bluetooth and/or Wi-Fi standards. Bluetooth-enabled devices, such as mobile devices that employ Bluetooth circuitry, are capable of being paired with peripherals that conform to the Bluetooth standard. The resulting link between paired devices is often referred to as a peer-to-peer network. Thus, the wireless communication link formed between the wireless communication circuitry 32 of the flashlight 10 and the mobile device is a peer-to-peer network. Similarly, Wi-Fi enabled devices, employing Wi-Fi circuitry, are also capable of connecting with peripherals that conform to the WiFi standard, thereby establishing a wireless communication link between the devices. In another exemplary embodiment, the wireless communication circuitry 32 may be configured to transmit radio frequency for wireless mobile communication, such as 3G, 4G or 5G or other wireless mobile communication technology of higher specification, to a mobile device employing wireless mobile communication circuitry. For example, the wireless communication circuitry 32 may be a Qualcomm MDM9206 LTE chipset with 3G/4G multimode and multiband support and may integrate LTE Cat-M1 LTE technology, 2G GSM/GPRS cellular technology, Wi-Fi enabled for 802.11ac standard technology and Bluetooth enabled for Bluetooth standard 4.1 technology. Alternatively, the wireless communication circuitry 32 may be a Quectel BG96 or BG95 chipset with LTE Cat-M1 LTE technology and, optionally, with LTE Narrowband IoT (NB-IoT) (also known as LTE Cat NB1) technology.

In one embodiment, the components disclosed herein may be provided on one or more printed circuit boards (or "PCBs"), which may contain such items as a controller, firmware, an authentication chip, a battery charging and control circuitry 36, among others. For example, the flashlight 10 may include a first PCB to control the light source 22, the wireless communication circuitry and the sensor 26 operations, and a second PCB to control the connector port 20 and battery charging and control circuitry 36. The first PCB may be electrically connected to the second PCB, for example, via a one or more wires or connectors. In an alternative embodiment, the components of the first PCB and the second PCB may be integrated onto a single PCB.

In one embodiment, the DC-DC switch may be integrated in the battery charging and control circuitry 36. As can be appreciated, the battery charging and control circuitry 36 may be configured to (a) receive a 5V charge via the power connector port 20; (b) control DC voltages in the flashlight 10 via the external 5V or from battery bank 24; (c) charge and/or manage the capacity of the battery bank 24; (d) control the operation of the battery bank 24; (e) control the charge-in and charge-out operation through the power connector port 20; and (f) adjust the usage or power intensity of the light source 22 when the battery bank 24 is being used to charge an external device (not shown). In one embodiment, the battery charging and control circuitry 36 may be configured to stop or halt power output to an external device if the capacity of the battery bank 24 is at or below a predetermined charge capacity (i.e., value set within the range between 5% charge capacity and 30% charge capacity) in order to preserve some battery charge for maintaining the operations of the flashlight 10.

Figure 9:
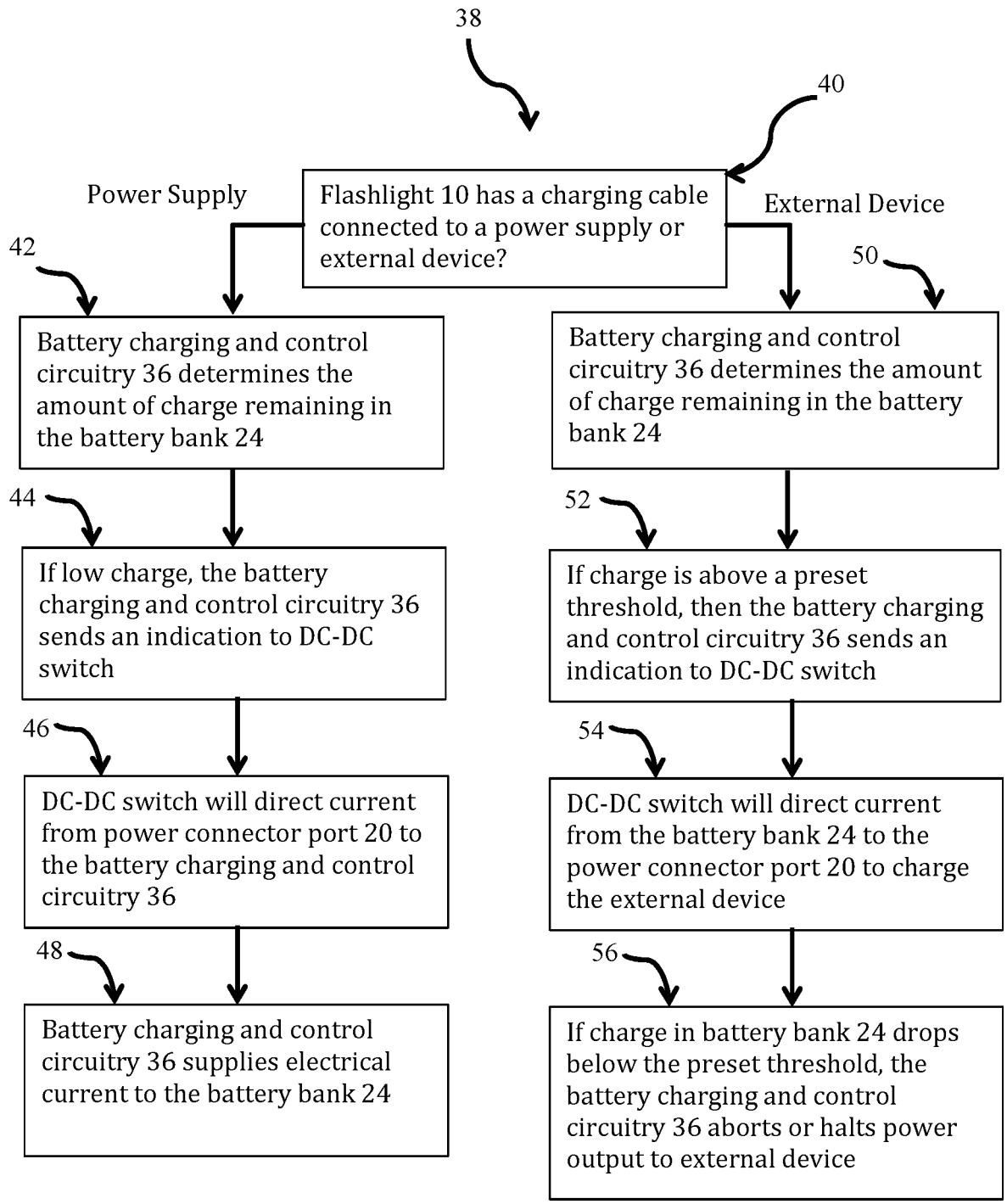
FIG. 9 is a flowchart illustrating exemplary operational features of the multi-mode portable flashlight of FIG. 1, according to an embodiment.

FIG. 9 is a flowchart 38 illustrating exemplary operational features of the flashlight of FIG. 1. In one embodiment, the battery charging and control circuitry 36 is configured to charge-in the battery bank 24 when connected to a power supply via a charging cable, and charge-out to an external device connected with the charging cable (40). Electrical current that is received via power connector port 20 is supplied to a DC-DC switch (not shown) and the battery charging and control circuitry 36. When the flashlight 10 has a charging cable (coupled to a power supply) inserted into power connector port 20, the battery charging and control circuitry 36 determines the amount of charge remaining in the battery bank 24 (42). When the battery bank 24 has a low charge, the battery charging and control circuitry 36 sends an indication to DC-DC switch that the battery bank 24 is in need of a charge. In such an instance, the DC-DC switch will direct the current received through power connector port 20 to the battery charging and control circuitry 36 (44). In one embodiment, the battery charging and control circuitry 36 may be a linear single-cell lithium ion battery charger integrated circuit. The battery charging and control circuitry 36 in turn supplies electrical current to the battery bank 24, resulting in charging the battery bank 24 (46).

Alternatively, when the flashlight 10 has a charging cable (coupled to an external device) is inserted into power connector port 20, the battery charging and control circuitry 36 determines the amount of charge remaining in the battery bank 24 (50). When the battery bank 24 has a charge that is above a preset threshold (i.e., within the range from 5% to 30% charge capacity), the battery charging and control circuitry 36 sends an indication to DC-DC switch to output power from the battery bank 24 to the external device (52). In such an instance, the DC-DC switch will direct the current received from the battery bank 24 through power connector port 20 to the external device (54). However, if the charge in the battery bank 24 is at or below or subsequent drops below the preset threshold, the battery charging and control circuitry aborts or suspends power transfer to prevent power output from the battery bank 24 to the external device (56).

Alternatively, when the flashlight 10 has a charging cable coupled to an auxiliary or external electronic device inserted into power connector port 20, the battery charging and control circuitry 36 may determine the amount of current being drawn by the auxiliary or external device. When the auxiliary or external device is drawing a relatively large amount of current (for example, 800 mA), the battery charging and control circuitry 36 sends an indication to DC-DC switch that the auxiliary device is in need of a charge. In such a high-current draw situation, DC-DC switch will direct current from the battery bank 24 through power connector port 20 to the auxiliary or external device. Should the battery charging and control circuitry 36 determines that the auxiliary or external device is drawing a relatively low amount of electrical current, DC-DC switch 34 reduces the amount of current being outputted to the auxiliary or external device.

Furthermore, when the flashlight 10 has a charging cable (coupled to an external device) inserted into power connector port 20, the battery charging and control circuitry 36 determines the amount of charge remaining in the battery bank 24 (50). When the battery bank 24 has a charge that is above a preset threshold (i.e., set at a value within the range 5% to 30% charge capacity), the battery charging and control circuitry 36 sends an indication to DC-DC switch to output power from the battery bank 24 to the external device (52). In such an instance, the DC-DC switch will direct the current received from the battery bank 24 through power connector port 20 to the external device (54). However, if the charge in the battery bank 24 drops is at or below or subsequently drops below the preset threshold, the battery charging and control circuitry aborts or suspends or prevents power output from the battery bank 24 to the external device (56).

Figure 10:
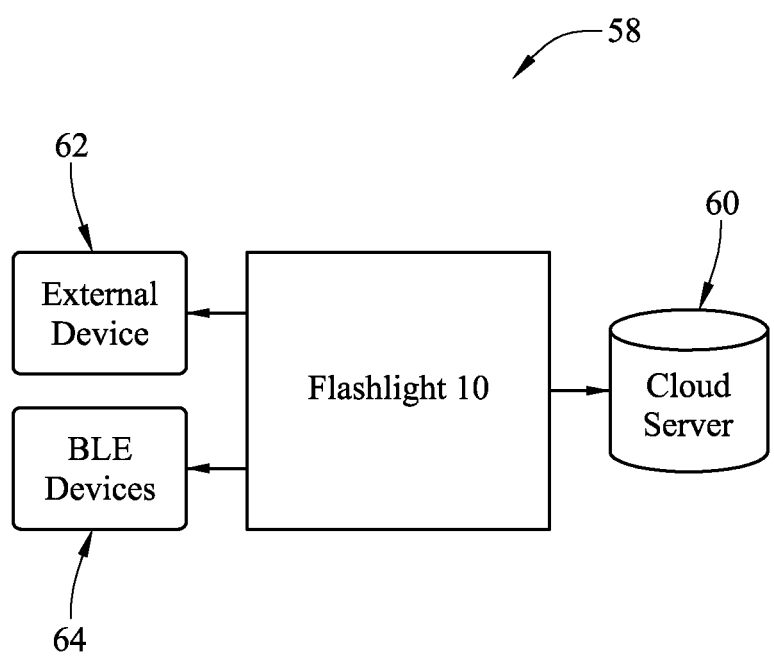
FIG. 10 is an exemplary block diagram of a communication system with the multi-mode portable flashlight of FIG. 1, according to an embodiment.
Figure 12:
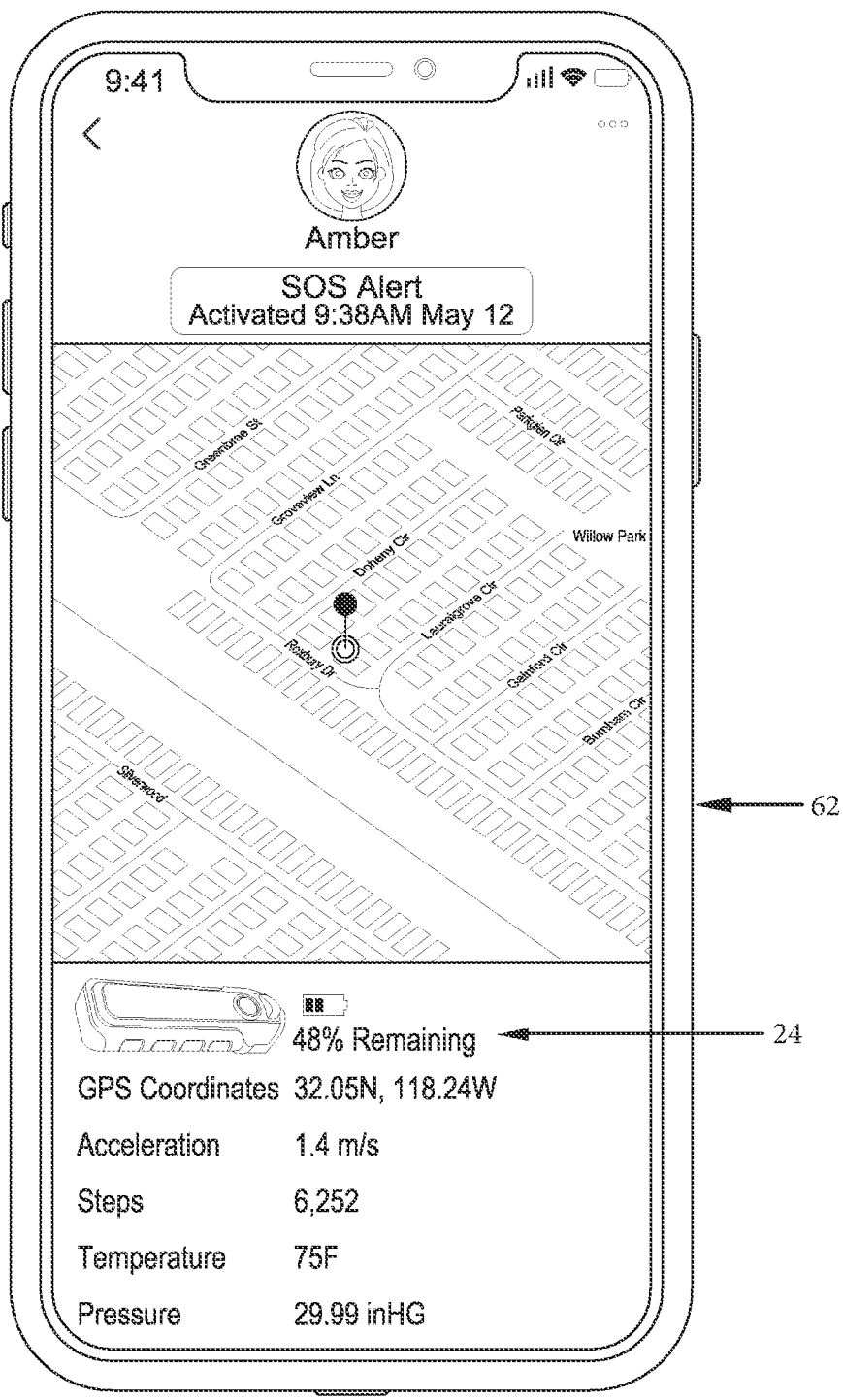
FIG. 12 is an exemplary display view on a mobile device when an app is used with the flashlight of FIG. 1, according to an embodiment.

FIG. 10 is an exemplary block diagram of a communication system with the flashlight of FIG. 1, according to an embodiment. As shown, flashlight 10 may utilize the wireless communication circuitry 32 to transmit and receive data to or from a cloud server 60, an external communication device 62, such as a mobile phone and/or other external connected devices 64, which may be running an application software (App) (i.e. mobile phone App). In one embodiment, the transmission of data may be sent via SMS or internet connection. As can be appreciated, data stored in memory 30 or detected from the one or more sensors 26 may be optionally transmitted to the mobile phone App via the wireless communication circuitry 32. In one embodiment, the mobile phone App may synthesize the data and/or display on the mobile device. Optionally, the remote server 60 synthesizes the sensor data and transmit to the mobile phone for display on the mobile phone App. For example, as shown in FIG. 12, GPS data may be mapped on a digital map (i.e. Google map) and displayed on the mobile device. Likewise, the battery bank 24 power usage may also be displayed on the mobile device App. Other conditions may also be detected by the flashlight 10 and displayed on the mobile phone App, including temperature, acceleration, steps and pressure, as shown in FIG. 12.

In an embodiment, the flashlight 10 may employ multiple active reporting modes to report status, for example, to the mobile App. For instance, the flashlight may employ a constant reporting mode, a timed reporting mode and/or a trip reporting mode. The reporting may be any predetermined or preset parameters for reporting. The constant reporting mode may actuate the flashlight 10 to remain up all the time (i.e. not in sleep mode) and the report is sent in a pre-determined interval. The time reporting mode may actuate the flashlight 10 to enter constant reporting mode during configured time periods (i.e. start-time and end-time), which can be as multiple periods over multiple days. Finally, the trip reporting mode may actuate the flashlight 10 to report when the flashlight 10 is in motion, which takes place when the accelerometer detects movement of the device. If the flashlight 10 is stationary, the reporting would terminate.

As can be appreciated, the flashlight 10 may be IP67 waterproof compliant. In one embodiment, the flashlight 10 may include latching clips 66 to hold the two halves 68 and 70 of the housing 14 with fluid dispensing for the seam. In another embodiment, the speaker 18 may include a waterproof sound-permeable membrane. In yet another embodiment, the flashlight 10 may include an air vent 72 with waterproof-breathable membrane.

The flashlight 10 may also include a protective coating 74 for water-resistance or water-proofing. For example, the flashlight 10 may include a polymeric coating formed using a continuous plasma comprising a compound of $CH_2=C(R_1)—COO—R_2$, where $R_1$ includes —H or —$CH_3$; and where $R_2$ includes —$(CH_2)_2$—$(CF_2)_m$—$CF_3$ and m is 3 or 5, as disclosed in U.S. Pat. No. 8,852,693, whose contents are incorporated by reference in their entirety. Artisans would appreciate that other commercially available compounds may be used for forming a polymeric coating 74 on the surface of the flashlight 10. In one embodiment, the protective coating 74 has a thickness between about 250 nm and about 500 nm.

In one embodiment, the protective coatings 74 may have an oleophobicity level of about at least 5, suitably between about level 5 to about level 10, including every level therebetween, such as about levels 5, 6, 7, 8, 9 or 10. Additionally, the coating can provide a water contact angle of at least 100.degree. In one aspect, the coating can provide a water contact angle between about 100.degree. to about 120.degree. Such characteristics of the coating can help protect against pollutants and contamination, including water or moisture contamination. In one embodiment, the coating can protect against liquid damage. In another aspect, the contamination or liquid damage can be water.

The coating material 74 may also be an antimicrobial coating. As will be appreciated by those skilled in the art, antimicrobial coatings may include additives such as silver, zinc, tin mercury, lead, iron, cobalt, nickel, manganese, arsenic, antimony, bismuth, barium, cadmium and chromium. Exemplary antimicrobial coatings may include, for example, those disclosed in U.S. Publ. Nos. US20060222845, US20070259307, US20110206817, US20090202656, US20090182337, and US20110311591, and in U.S. Pat. Nos. 8,080,028, 6,238,686, 5,770,255, 5,753,251, 5,681,575, 8,084,132, 7,884,089, 7,625,579, 7,955,636, 5,066,328, 8,124,169, 4,933,178, 8,066,854, 6,929,705, 5,997,815, 7,282,214, 7,976,863, 6,514,517, 5,238,749, 8,137,735, 6,592,814, 8,172,395, 7,402,318, 8,133,423, 5,853,745, 6,565,913, 8,178,120, 6,361,567, 5,756,145, 7,641,912, 6,900,265 and 5,244,667, each of which is incorporated by reference herein in its entirety. The coating material may also be a fire-resistant coating. Suitable fire-resistant coatings include, for example, those disclosed in U.S. Pat. Nos. 5,322,555, 5,236,773, U.S. Publ. No. US20060083878, and PCT Appl. No. PCT/EP2000/004914, each of which is incorporated by reference herein in its entirety. The coating material may also be a scratch resistant coating. Suitable scratch resistant coatings may include, for example, those disclosed in U.S. Pat. Nos. 7,867,602, 5,837,362, 6,025,059, 7,264,669, 7,115,050, 6,916,368, 6,020,419, 6,803,408, 6,835,420, 6,759,478, 8,163,357, 6,387,519, 7,053,149, 7,662,433, and 7,871,690, and U.S. Publ. Nos. US20120100380, US20110097574, US20100119802, US20110058142, US20120121845, US20120003483, and US20110151218, each of which is incorporated by reference herein in its entirety.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this disclosure is not be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

Further, all claim terms should be interpreted in their most expansive forms so as to afford the applicant the broadest coverage legally permissible. Although the embodiments have been described with reference to the drawings and specific examples, it will readily be appreciated by those skilled in the art that many modifications and adaptations of the processes, methods and apparatuses described herein are possible without departure from the spirit and scope of the embodiments as claimed herein. Thus, it is to be clearly understood that this description is made only by way of example and not as a limitation on the scope of the embodiments as claimed below.

What is claimed is:

1. A portable lighting device comprising:
a housing having a proximal end and a distal end, the housing defining a hollow cavity;
a light source disposed at the proximal end of the housing;
a rechargeable battery electrically coupled to the light source;
battery charging and control circuitry disposed in the cavity of the housing and operatively coupled to the rechargeable battery;
a power connector port electrically coupled to the battery charging and control circuitry, the power connector port configured to receive current from a power source and supply current to an external device, wherein the battery charging and control circuitry configured to control transmission of current from the rechargeable battery to the light source, the battery charging and control circuitry further configured to control transmission of current from the rechargeable battery through the power connector port and onto the external device, the transmission of current to the external device occurs when the rechargeable battery has a charge capacity above a predetermined threshold level and terminates when the charge capacity of the rechargeable battery is at or below the predetermined threshold level;
a wireless communication circuitry operatively coupled with the battery charging and control circuitry, the wireless communication circuitry configured to transmit a battery condition information of the rechargeable battery to an external communication device through a wireless link; and
a protective coating disposed on an exterior surface of the housing, the protective coating has an oleophobicity level of at least 5 and a thickness between about 250 nm and about 500 nm.

2. The portable lighting device of claim 1, further comprising: at least one sensor electrically coupled to the rechargeable battery and disposed in the cavity of the housing, the at least one sensor configured to detect a condition in which the portable lighting device is exposed and to output an associated sensor data, the at least one sensor comprising a Global Positioning Satellite (GPS) locator; and wherein the wireless communication circuitry is operatively coupled with the at least one sensor, and configured to transmit the sensor data to the external communication device.

3. The portable lighting device of claim 1, wherein the predetermined threshold level is set at a value within a range between 5% charge capacity and 30% charge capacity.

4. The portable lighting device of claim 2, wherein the at least one sensor is a temperature sensor, an accelerometer, a pedometer, or any combination of any of the foregoing.

5. The portable lighting device of claim 2, further comprising a memory electrically coupled to a processor and the at least one sensor, the memory storing data selected from a group consisting of sensor data, model number data, part number data, serial number data, manufacturing data, electrical power source data, battery data, electrical power source charging data, battery charging data, operating time data, operating mode data, user operating mode settings, voltage data, current data, processor data, firmware data, failure data, diagnostic data, or any combination of any of the foregoing.

6. The portable lighting device of claim 1, wherein the wireless link is formed between the wireless communication circuitry and a Bluetooth circuitry of the external communication device.

7. The portable lighting device of claim 1, wherein the power connector port is selected from a group consisting of a USB-C connector port, a micro-USB connector port, a USB connector port and a Lighting® connector port.

8. A portable lighting system comprising:
a flashlight, the flashlight comprising a housing having a proximal end and a distal end, a light source disposed at the proximal end of the housing, a rechargeable battery electrically coupled to the light source, a battery charging and control circuitry disposed in the housing and operatively coupled to the light source and the rechargeable battery bank, the battery charging and control circuitry coupled to a power connector port for receiving and supplying current, the battery charging and control circuitry configured to control transmission of current from the rechargeable battery bank to the light source, the battery charging and control circuitry further configured to supply current from the rechargeable battery bank through the power connector port and onto an electrically coupled external device when the rechargeable battery bank has a charge capacity above a predetermined threshold level, the predetermined threshold level is set at a value within a range between 5% charge capacity and 30% charge capacity, and a wireless communication circuitry operatively coupled with the battery charging and control circuitry, the wireless communication circuitry configured to transmit a battery condition information of the rechargeable battery to an external communication device through a wireless link;
a software application running on the external communication device, the software application provides the battery condition information of the rechargeable battery pack; and
a protective coating disposed on an exterior surface of the housing, the protective coating has an oleophobicity level of at least 5 and a thickness between about 250 nm and 500 nm.

9. The portable lighting system of claim 8, wherein the flashlight further comprises: at least one sensor disposed in the cavity of the housing and configured to detect a condition in which the portable lighting device is exposed and to output an associated sensor data, the at least one sensor comprising a Global Positioning Satellite (GPS) locator, the wireless communication circuitry is operatively coupled with the at least one sensor, and configured to transmit the sensor data to the external communication device through the wireless link.

10. The portable lighting system of claim 9, and wherein the software application provides a condition in which the flashlight is exposed based on the sensor data received from the flashlight.

11. The portable lighting system of claim 9, wherein the at least one sensor is a temperature sensor, an accelerometer, a pedometer, or any combination of any of the foregoing.

12. The portable lighting system of claim 8, wherein the wireless link is formed between the wireless communication circuitry and circuitry of the external communication device, the circuitry selected from a group consisting of Bluetooth circuitry, Wi-Fi circuitry and wireless mobile communication circuitry.

13. The portable lighting system of claim 8, wherein the power connector port is selected from a group consisting of a USB-C connector port, a micro-USB connector port, a USB connector port and a Lighting® connector port.

14. A portable lighting device comprising:
a housing having a proximal end and a distal end, the housing defining a hollow cavity; a light source disposed at the proximal end of the housing;
a rechargeable battery bank electrically coupled to the light source;
a power connector port operatively coupled to the rechargeable battery bank and configured to receive current from a power source and supply current to an external device;
battery charging and control circuitry disposed in the cavity of the housing and operatively coupled to the power connector port and the rechargeable battery bank, the battery charging and control circuitry configured to facilitate transmission of current from the rechargeable battery bank to the light source, the battery charging and control circuitry further configured to facilitate transmission of current from the rechargeable battery bank to the external device when the rechargeable battery bank has a charge capacity above a predetermined threshold level, and to preclude transmission of current when the charge capacity of the rechargeable battery is at or below the predetermined threshold level; and
a protective coating disposed on an exterior surface of the housing, the protective coating has an oleophobicity level of at least 5 and a thickness between about 250 nm and 500 nm.

15. The portable lighting device of claim 14, further comprising a wireless communication circuitry operatively coupled with the battery charging and control circuitry, the wireless communication circuitry configured to transmit a battery condition information of the rechargeable battery to an external communication device through a wireless link.

16. The portable lighting device of claim 14, wherein the power connector port is selected from a group consisting of a USB-C connector port, a micro-USB connector port, a USB connector port and a Lighting® connector port.

17. The portable lighting device of claim 14, wherein the predetermined threshold level set at a value within a range between 5% charge capacity and 30% charge capacity.

\* \* \* \* \*